(12) United States Patent
Jones et al.

(10) Patent No.: US 10,844,520 B2
(45) Date of Patent: Nov. 24, 2020

(54) POLYPROPYLENE YARN HAVING INCREASED YOUNG'S MODULUS AND METHOD OF MAKING SAME

(75) Inventors: David Michael Jones, Dacula, GA (US); Kevin Nelson King, Alto, GA (US)

(73) Assignee: NICOLON CORPORATION, Pendergrass, GA (US)

( * ) Notice: Subject to any disclaimer, the term of this patent is extended or adjusted under 35 U.S.C. 154(b) by 823 days.

(21) Appl. No.: 13/085,165

(22) Filed: Apr. 12, 2011

(65) Prior Publication Data

US 2011/0250448 A1    Oct. 13, 2011

Related U.S. Application Data

(60) Provisional application No. 61/323,212, filed on Apr. 12, 2010, provisional application No. 61/407,184, filed on Oct. 27, 2010.

(51) Int. Cl.
| | |
|---|---|
| *D02G 3/22* | (2006.01) |
| *D01F 6/46* | (2006.01) |
| *D01F 1/02* | (2006.01) |
| *C08L 23/12* | (2006.01) |
| *C08L 23/16* | (2006.01) |

(52) U.S. Cl.
CPC .............. *D01F 6/46* (2013.01); *C08L 23/12* (2013.01); *D01F 1/02* (2013.01); *C08L 23/16* (2013.01); *Y10T 428/2904* (2015.01)

(58) Field of Classification Search
CPC .......... C08L 23/12; C08L 23/00; C08L 23/16; C08L 2666/06; D01F 1/02; D01F 6/46

USPC ......................................................... 428/359
See application file for complete search history.

(56) References Cited

U.S. PATENT DOCUMENTS

| | | | |
|---|---|---|---|
| 3,278,663 A | 10/1966 | Graham | |
| 3,337,665 A | 8/1967 | Underwood et al. | |
| 3,395,198 A | 7/1968 | Taniguchi et al. | |
| 3,456,044 A | 7/1969 | Pahlke | |
| 4,258,097 A * | 3/1981 | Benedyk | 428/219 |
| 4,590,106 A | 5/1986 | Hsu et al. | |
| 4,760,116 A | 7/1988 | Roberts | |
| 4,769,421 A | 9/1988 | Hwo | |
| 4,797,235 A | 1/1989 | Garland et al. | |

(Continued)

FOREIGN PATENT DOCUMENTS

| | | |
|---|---|---|
| CN | 1969068 A | 5/2007 |
| CN | 101177823 A | 5/2008 |

(Continued)

OTHER PUBLICATIONS

PCT/US2011/032127_International Search Report dated Jun. 24, 2011.

(Continued)

*Primary Examiner* — Vincent Tatesure
(74) *Attorney, Agent, or Firm* — Cantor Colburn LLP (57) ABSTRACT

The present invention is directed to a monofilament, a yarn, a tape, or a staple fiber, each having 1 to 12,000 Denier per filament, a draw ratio of 2.5:1 to 25:1, and made of a polypropylene composition of a melt blended admixture of about 93% by weight of polypropylene, about 5% by weight of a polypropylene/ethylene copolymer, and about 2 wt. % of an additive. Also, a process for preparing the monofilament, yarn, tape, or staple fiber is disclosed.

27 Claims, 4 Drawing Sheets

(56) References Cited

U.S. PATENT DOCUMENTS

| | | | |
|---|---|---|---|
| 4,886,634 A | | 12/1989 | Strutzel et al. |
| 5,272,003 A | * | 12/1993 | Peacock ................... 428/357 |
| 5,468,259 A | | 11/1995 | Sheth et al. |
| 2006/0240733 A1 | | 10/2006 | Bieser et al. |
| 2007/0015877 A1 | | 1/2007 | Burkhardt et al. |
| 2008/0114130 A1 | | 5/2008 | Ashbaugh et al. |
| 2008/0261471 A1 | * | 10/2008 | Chen ................... B29C 43/36 442/60 |

FOREIGN PATENT DOCUMENTS

| | | |
|---|---|---|
| CN | 101495692 A | 7/2009 |
| CN | 101535540 A | 9/2009 |
| WO | 2005111282 A1 | 11/2005 |
| WO | 2007140163 A2 | 12/2007 |

OTHER PUBLICATIONS

PCT/US2011/032127_Written Opinion dated Jun. 24, 2011.
Chinese Search Report dated Feb. 10, 2014 for Application No. 201180018568.0.
Chinese Office Action dated Sep. 29, 2014 for Application No. 201180018568.0.
Gachter, Reinhard, et al.; "Plastics Additives Handbook: Stabilizers, Processing Aids, Plasticizers, Fillers, Reinforcements, Colorants for Thermoplastics"; Hanser Publishers; p. 647-659; 1990.
Alan D. Wright, et al.; "Modulus of Elasticity (Young's Modulus), E"; Compendium of Chemical Terminology; International Union of Pure and Applied Chemistry, Second Edition; p. 1-3; 1997.
Communication pursuant to Article 94(3) EPC issued in EP Application Serial No. 11716124.0 dated Mar. 20, 2017.
Communication pursuant to Article 94(3) EPC issued in EP Application Serial No. 11716124.0 dated Feb. 7, 2018.
Mexican Office Action issued in Application Serial No. MX/a/2012/011732 dated Feb. 6, 2015.
Mexican Office Action issued in Application Serial No. MX/a/2012/011732 dated Mar. 16, 2016.
Mexican Office Action issued in Application Serial No. MX/a/2012/011732 dated Sep. 10, 2015.
Canadian Office Action issued in Application Serial No. 2,795,939 dated Dec. 14, 2016.
Chinese Office Action issued in Application Serial No. 201180018568.0 dated Feb. 18, 2014.

* cited by examiner

POLYPROPYLENE YARN HAVING INCREASED YOUNG'S MODULUS AND METHOD OF MAKING SAME

CROSS-REFERENCE TO RELATED APPLICATIONS

This application claims benefit of U.S. Provisional Patent Application Ser. No. 61/323,212 filed Apr. 12, 2010 and U.S. Provisional Patent Application Ser. No. 61/407,184 filed Oct. 27, 2010, both of which are incorporated herein in their entirety by reference.

TECHNICAL FIELD

The instant invention generally is related to polypropylene. More specifically, the instant invention is related to polypropylene yarns employed in woven and nonwoven fabrics and methods of making such yarns. In addition, the instant invention is related to woven and nonwoven fabrics employing polypropylene yarns.

BACKGROUND OF THE INVENTION

Polypropylene is used in the manufacture of yarn or tape which can be employed in textile operations. In particular, polypropylene can be utilized to form films and similar materials having a small or reduced thickness. One example of such a material is polypropylene slit film tape. Polypropylene slit film tape is used in a myriad of applications. Common applications for polypropylene slit film tapes include carpet backing; industrial-type bags, sacks, or wraps; ropes or cordage; artificial grass; and geotextiles.

Typically, an extrusion process is employed to manufacture polypropylene slit film tape. However, conventionally manufactured polypropylene slit film tape can have insufficient strength for certain woven fabric applications, for example, geotextile applications.

Polypropylene film can be formed from the molten polymer by a number of conventional methods. For example, in cast film extrusion, flat films can be extruded into a cooling water bath or onto chilled rolls for quenching. Films can be oriented in one direction by hot-drawing with a tensioning device, and annealing. Films can also be oriented in two directions (machine direction and transverse direction) by suitable tensioning devices. Oriented polypropylene films are useful for a wide variety of applications.

Slit film tapes can be prepared from the extruded polypropylene film by slitting the film with knives or other cutting devices after quenching and before or after orienting the film. The tapes may then be stretched (i.e. uniaxially oriented) to several times their original length by hot-drawing in the machine direction with a tensioning device and annealing the stretched tapes.

To conserve material, and therefore to conserve cost, it is desirable to reduce the denier of tapes and the thickness of films, typically by increasing the stretch ratio. With conventional polypropylene compositions, however, higher stretch ratios and reduced denier can result in unacceptable degradation of physical properties such as tensile breaking load, tenacity (tensile breaking stress), and elongation at break.

Yet, there still exists a need to improve the mechanical properties such as tensile breaking load, tenacity, and elongation to break of polypropylene compositions used in slit-film tapes. It is to solving this need the present invention is directed.

SUMMARY OF THE INVENTION

The present invention is directed to a monofilament, a yarn, a tape, or a staple fiber and a process for preparing same. In one aspect of the present invention, the monofilament, yarn, tape, or staple fiber is a 1 to 12,000 Denier per filament and has a draw ratio of 2.5:1 to 25:1. The monofilament, yarn, tape, or staple fiber is made of a polypropylene composition comprising a melt blended admixture of about 94 to about 95% by weight of polypropylene and about 5 to about 6% by weight of a polypropylene copolymer having an ethylene content of about 16% by weight of copolymer.

In another aspect of the present invention, the monofilament, yarn, tape, or staple fiber is made of a polypropylene composition comprising a melt blended admixture of about 93% by weight of polypropylene, about 5% by weight of a polypropylene copolymer having an ethylene content of about 16% by weight of copolymer, and about 2 wt. % of an additive.

Yet, in another aspect of the present invention, the monofilament, yarn, tape, or staple fiber comprises a melt blended admixture of about 92 to about 95% by weight of polypropylene and about 5% to about 8% by weight of a polypropylene/ethylene copolymer based upon the total weight of the admixture and has a percent improvement in Young's modulus of at least 10% over a monofilament, yarn, tape, or staple fiber formed of polypropylene homopolymer of like cross-sectional shape and Denier.

A process for preparing a slit film tape comprises:
a) preparing a composition comprising about 94 to about 95% by weight of polypropylene and about 5 to about 6% by weight of a polypropylene copolymer having an ethylene content between about 8% and about 25% by weight of copolymer;
b) forming the composition into a film;
c) slitting the film into a tape; and
d) hot-drawing the tape at a temperature below the melting point of the composition and at a draw ratio between 2.5:1 and 25:1 to produce the slit film tape.

In another aspect of the present invention, the process for preparing a slit film tape comprises:
a) preparing a composition comprising about 93% by weight of polypropylene, about 5% by weight of a polypropylene copolymer having an ethylene content between about 8% and about 25% by weight of copolymer, and about 2 wt. % of an additive;
b) forming the composition into a film;
c) slitting the film into a tape; and
d) hot-drawing the tape at a temperature below the melting point of the composition and at a draw ratio between 2.5:1 and 25:1 to produce the slit film tape.

Yet, in another aspect of the present invention, a process for preparing a mono filament comprises:
a) preparing a composition comprising about 94 to about 95% by weight of polypropylene homopolymer and about 5 to about 6% by weight of a polypropylene copolymer having an ethylene content between about 8% and about 25% by weight of copolymer;
b) forming the composition into a filament; and
c) hot-drawing the monofilament at a temperature below the melting point of the homopolymer and at a draw ratio between 2.5:1 and 25:1 to produce the monofilament.

Still, in another aspect of the present invention, a process for preparing a monofilament comprises:

a) preparing a composition comprising about 93% by weight of polypropylene, about 5% by weight of a polypropylene copolymer having an ethylene content between about 8% and about 25% by weight of copolymer, and about 2 wt. % of an additive;

b) forming the composition into a filament; and c) hot-drawing the monofilament at a temperature below the melting point of the homopolymer and at a draw ratio between 2.5:1 and 25:1 to produce the monofilament.

The additive includes, but is not limited to, a colorant, a filler, a delustrant, a thermal stabilizer, an ultraviolet light absorber, an ultraviolet light stabilizer, a terminating agent, an antioxidant, a metal deactivator, a phosphite, a phosphonite, a fluorescent whitening agent, a thiosynergist, a peroxide scavenger, a nucleating agent, a plasticiser, a lubricant, an emulsifier, a rheology additive, a catalyst, a flow-control agent, an optical brightener, a flameproofing agent, an antistatic agent, a blowing agent, a benzofuranone, an indolinone, a hydrophilic agent, a hydrophobic agent, an oliophobic agent, an oliophilic agent, or any combination thereof. In one aspect of the present invention, the additive is carbon black.

DETAILED DESCRIPTION OF THE INVENTION

The present invention is directed to a polymer composition and films, tapes, monofilaments, yarns, or staple fibers made from such polymer composition. Tape, monofilament and yarn made in accordance with the present invention can be utilized in woven or knitted fabrics. In addition, staple fibers made in accordance with the present invention can be utilized to manufacture a non-woven fabric or product.

"Fiber" means a material in which the length to diameter ratio is greater than about 10. Fiber is typically classified according to its diameter. Filament fiber is generally defined as having an individual fiber diameter greater than about 15 denier, usually greater than about 30 Denier per filament. Fine denier fiber generally refers to a fiber having a diameter less than about 15 Denier per filament. Microdenier fiber is generally defined as fiber having a diameter less than about 100 microns denier per filament.

"Filament fiber" or "monofilament fiber" means a continuous strand of material of indefinite (i.e., not predetermined) length, as opposed to a "staple fiber".

"Staple fiber" is a discontinuous strand of material of definite length (i.e., a strand which has been cut or otherwise divided into segments of a predetermined length). Staple fibers made in accordance with the present invention can be made into non-woven webs and fabrics using any methods currently used or hereafter discovered, including spunlacing, needle-punching, thermal bonding, and card-and-bind processing.

"Meltspun fibers" are fibers formed by melting the thermoplastic polymer composition described herein and then drawing the fiber in the melt to a diameter (or other cross-section shape) less than the diameter (or other cross-section shape) of the die.

"Spunbond fibers" are fibers formed by extruding the molten thermoplastic polymer composition described herein as filaments through a plurality of fine, usually circular, die capillaries of a spinneret (not shown). The diameter of the extruded filaments is rapidly reduced, and then the filaments are deposited onto a collecting surface to form a web of randomly dispersed fibers with average diameters generally between about 7 and about 30 microns.

"Nonwoven" means a web or fabric having a structure of individual fibers or threads which are randomly interlaid, but not in an identifiable manner as is the case of a knitted or woven fabric. The fiber in accordance with the present invention can be employed to prepare nonwoven structures.

"Yarn" means a continuous length of twisted or otherwise entangled plurality of filaments (i.e. multifilament) which can be used in the manufacture of woven or knitted fabrics and other articles. Yarn can be covered or uncovered. Covered yarn is yarn at least partially wrapped within an outer covering of another fiber or material, for example, cotton or wool.

Fibers and yarns can be made into fabrics using any methods currently used or hereafter discovered for making fibers and yarns into fabrics, including but not limited to weaving and knitting.

A woven fabric typically has two principle directions, one being the warp direction and the other being the weft direction. The weft direction is also referred to as the fill direction. The warp direction is the length wise, or machine direction of the fabric. The fill or weft direction is the direction across the fabric, from edge to edge, or the direction traversing the width of the weaving machine. Thus, the warp and fill directions are generally perpendicular to each other. The set of yarns, threads, or monofilaments running in each direction are referred to as the warp yarns and the fill yarns, respectively.

A woven fabric can be produced with varying densities. This is usually specified in terms of number of the ends per inch in each direction, warp and fill. The higher this value is, the more ends there are per inch and, thus, the fabric density is greater or higher.

The weave pattern of fabric construction is the pattern in which the warp yarns are interlaced with the fill yarns. A woven fabric is characterized by an interlacing of these yarns. For example, plain weave is characterized by a repeating pattern where each warp yarn is woven over one fill yarn and then woven under the next fill yarn. There are many variations of weave patterns commonly employed in the textile industry, and those of ordinary skill in the art are familiar with most of the basic patterns. While it is beyond the scope of the present application to include a disclosure of these multitude of weave patterns, the basic plain, twill, satin, weave patterns can be employed with the present invention. However, such patterns are only illustrative, and the invention is not limited to such patterns. It should be understood that those of ordinary skill in the art will readily be able to determine how a given weave pattern could be employed in practicing the present invention in light of the parameters herein disclosed.

A twill weave, relative to the plain weave, has fewer interlacings in a given area. The twill is a basic type of weave, and there are a multitude of different twill weaves. A twill weave is named by the number of fill yarns which a single warp yarn goes over and then under. For example, in a 2/2 twill weave, a single warp end weaves over two fill yarns and then under two fill yarns. In a 3/1 twill weave, a single warp end weaves over three fill yarns and then under one fill yarn. For fabrics being constructed from the same type and size of yarn, with the same thread or monofilament densities, a twill weave has fewer interlacings per area than a corresponding plain weave fabric.

A satin weave, relative to the twill and plain weaves, has fewer interlacings in a given area. It is another basic type of weave from which a wide array of variations can be produced. A satin weave is named by the number of ends on which the weave pattern repeats. For example, a five harness satin weave repeats on five ends and a single warp yarn floats over four fill yarns and goes under one fill yarn. An eight harness satin weave repeats on eight ends and a single warp yarn floats over seven fill yarns and passes under one fill yarn. For fabrics being constructed from the same type of yarns with the same yarn densities, a satin weave has fewer interlacings than either a corresponding plain or twill weave fabric.

The process for making fabrics, to include geotextile fabrics, is well known in the art. Thus, the weaving process employed can be performed on any conventional textile handling equipment suitable for producing the fabric comprising. Further, any of the aforementioned patterns weaves may be employed as long as the protective layer made therefrom is sufficient to provide the aforementioned cut and tear resistance while maintaining permeability for water, soil, and air.

An example of a product employing a fabric comprising the novel monofilament, yarn, and/or tape described herein is a parachute, in particular, the canopy of the parachute. A parachute typically comprises a canopy, a plurality of suspensions lines, also referred to as risers or rigging lines, and a connecting apparatus, such as a harness, a hooking mechanism, a belt, and the like, to connect a load to the parachute. The canopy defines a periphery, and the respective suspension lines are attached at an upper end thereof to the canopy proximate the periphery. At a lower end thereof, the respective suspension lines are connected to the connecting apparatus. The load, such as a parachutist or cargo, is connected to the parachute by securing the load to the connecting apparatus.

Generally, there are three basic types of parachute designs employed for airborne delivery of personnel and cargo. One type is the generally hemispherical canopy with the suspension lines connected around a continuous circular lower edge of the canopy, i.e, the periphery. Another parachute design is the ram air type parachute with upper and lower surfaces generally in the shape of an airfoil with the suspension lines connected to the bottom surface. A third type is the cruciform or cross parachute. The cruciform parachute has a canopy that is a generally square crown or center section with four wings or arms attached to the four sides with the suspension lines attached along the outer edges of the arms. There are many variants of these three basic parachute designs. It is also common to utilize more than one parachute for loads of significant weight and/or to provide additional stability during airborne descent.

The woven fabric comprising the novel monofilament, yarn, and/or tape described herein can be employed in parachute designs to form the canopy. The rate and stability of parachute decent and success of canopy deployment is significantly influenced by the fabric employed to make the canopy. It is desired for the fabric to be drapable and easily foldable so that it can be sewn or shaped into the desired canopy design and subsequently packed into a tight deployment container or bag.

For example, a fabric employing the novel monofilament, yarn, and/or tape described herein for use as a parachute canopy has the properties described in Table I below. The indicated American Society for Testing and Materials (ASTM) test method is employed to evaluate the specified property.

TABLE 1

| Material Characteristic | Test Method | Value |
| --- | --- | --- |
| Weight, Ounces/Yard$^2$ | ASTM D 5261 | Up to about 2.7 |
| Warp Tensile Strength, Pound | ASTM D 4632 | At least 138 |
| Fill Tensile Strength, Pound | ASTM D 4632 | At least 95 |
| Warp Elongation, (%) | ASTM D 4632 | At least 20 |
| Fill Elongation, (%) | ASTM D 4632 | At least 15 |
| Warp Tear Strength, Pound | ASTM D 4533 | At least 60 |
| Fill Tear Strength, Pound | ASTM D 4533 | At least 50 |
| Air Permeability, Cubic FT. per minute per SQ. FT. | ASTM D 737 | 16-40 |

The fabric employed in the canopy can be made using a conventional weaving method to produce a plain weave fabric. A weave other than plain weave may be employed; however, the plain weave can produce a fabric which has a lower coefficient of friction due to a smoother fabric surface.

The yarn employed in the fabric is typically long, flexible, and relatively thin. It is selected to provide the desired strength, wear, laundering, durability, and other requirements of the end use to which the fabric is intended to be put. In one aspect flat, slit tape yarns are employed as the warp and weft yarns. In the conventional method warp yarns are placed horizontally side by side in a loom, with alternate yarns being separated by a system of frames. During each weave, the frames pull the alternate yarns vertically apart. Through this space is passed a mechanism, such as a shuttle, carrying the weft yarn, which moves across at high speed. The weft yarn is held straight under tension while the warp-holding frames change position, causing the warp yarns to be wrapped over and under the monofilament or slit tape yarns.

In production of the fabric, the width of the slit tape yarns respectively used in the weft and warp directions and the number of ends or picks, i.e., the number of yarns present in each of the warp (ends) and the weft (picks) can be changed to produce fabrics having variations in air flow volume which can pass through the openings in the fabric.

Flat, slit tape yarns used in the warp and weft directions of the fabric employed in the canopy are typically flat yarns having a high aspect ratio. For example, such flat yarns are slit film, tape yarns. Slit film, tape yarns can be made by forming a film of resin in the desired thickness and then slitting the film into flat yarns of the desired width. Additionally, the flat yarns can also be made by extrusion of the yarn resin through a square or rectangularly shaped die.

The flat yarns employed in the canopy fabric have a width in the range of about 40 mils to about 150 mils. In another aspect, the flat yarns are in the range of about 40 mils to about 60 mils. Yet, in another aspect, the flat yarns have a width of or a range between about 40 mils, 50 mils, 60 mils, 70 mils, 80 mils, 90 mils, 100 mils, 110 mils, 120 mils, 130 mils, 140 mils, and 150 mils. Still, in another aspect, the flat yarns are about 50 mils wide. Flat yarns in this range can be woven in a compacted fashion using a relatively lower number of ends. The thickness of the tape yarns can be any convenient thickness. In one aspect, the canopy fabric employs tape yarns having a thickness of about two mils, thereby providing sufficient durability for repeated use. In another aspect, the tape yarns have a thickness between about two to about 3 mils. Yet, in another aspect, the tape yarns have a thickness of about 3 mils. The aspect ratio of the flat yarns is in the range of about 16:1 to about 75:1. In another aspect, the aspect ration is in the range of about 16:1 to about 36:1, because yarns of this size can be woven using the aforementioned end counts to produce a compacted warp.

In addition to the novel monofilament, yarn, and/or tape described herein, a fabric, to include the canopy fabric, can employ monofilament, yarn, and/or tape comprising of any synthetic or natural material. For use in the canopy fabric, such monofilament, yarn, and/or tape is selected to have sufficient tensile strength to achieve sufficient woven tensile strength when made into a fabric.

In addition, any of the monofilaments, yarns, and/or tape, to include the novel monofilament, yarn, and/or tape described herein, can include additives, such as colorants or ultraviolet stabilizers. For durability the conventional tape yarns and the monofilament yarns comprise a synthetic thermoplastic material such as polyester, polyaramid, acrylic polymers, polyolefin or blends or co-polymers thereof. In another aspect of the invention, the conventional tape yarns and monofilament yarns are made substantially from a polyester or a polyolefin. Yet, in another aspect of the invention, the conventional tape yarns and monofilament yarns are made substantially from polypropylene. The conventional flat yarns and the monofilament yarns can be made from the same or from different resins.

The canopy fabric is constructed so that the number of ends in the warp is in the range from about 10 per inch to about 32 per inch. In another aspect the number of ends is in the range from about 20 per inch to about 32 per inch. Still, in another aspect, the number of ends in the warp is about or in the range between 10, 11, 12, 13, 14, 15, 16, 17, 18, 19, 20, 21, 22, 23, 24, 25, 26, 27, 28, 29, 30, 31, and 32 per inch. Yet, in another aspect the canopy fabric is constructed with 24 ends per inch. Still yet, in another aspect the canopy fabric is constructed with 15.7 ends per inch.

The weft of the canopy fabric typically has a number of picks in the range from about 6 per inch to about 20 per inch. In another aspect the number of picks is in the range from about 11 per inch to about 16 per inch to provide sufficient compaction to limit air flow through the fabric. Yet, in another aspect the fabric has about 14.2 picks per inch. Still, in another aspect the number of picks in the weft is about or in the range between 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, and 18 per inch.

The canopy fabric of the invention is light in weight and generally will range in weight from about 2.0 oz/yd$^2$ to about 6.0 oz/yd$^2$. In another aspect the canopy fabric has a weight in a range from about 3.0 oz/yd$^2$ to about 6.0 oz/yd$^2$. Still, in another aspect the canopy fabric is less than 4.0 oz/yd$^2$. Still, in another aspect the canopy fabric has a weight of about 2.7 oz/yd$^2$. Still yet, the canopy fabric has a weight of about or in a range between 2, 2.5, 3, 3.5, 4, 4.5, 5, 5.5, and 6 oz/yd$^2$. The fabric weight is in part due to the denier of the yarns used. The yarns of the canopy fabric can be of any denier to produce yarns of sufficient tensile strength.

Novel Monofilament, Yarn, Tape, or Staple Fiber

Disclosed herein is a novel monofilament, yarn, tape, or staple fiber and a process for preparing same. In one aspect, the monofilament, yarn, tape, or staple fiber is a 1 to 12,000 Denier per filament and has a draw ratio of 2.5:1 to 25:1. In another aspect, the monofilament, yarn, tape, or staple fiber has a draw ratio of 8:1. Yet, in another aspect, the monofilament, yarn, tape, or staple fiber has a draw ratio of or is in a range between any of 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, 10:1, 10.5:1, 11:1, 11.5:1, 12:1, 12.5:1, 13:1, 13.5:1, 14:1, 14.5:1, 15:1, 15.5:1, 16:1, 16.5:1, 17:1, 17.5:1, 18:1, 18.5:1, 19:1, 19.5:1, 20:1, 20.5:1, 21:1, 21.5:1, 22:1, 22.5:1, 23:1, 23.5:1, 24:1, 24.5:1, and 25:1.

The monofilament, yarn, tape, or staple fiber is made of a polypropylene composition comprising a melt blended admixture of about 94 to about 95% by weight of polypropylene and about 5 to about 6% by weight of a polypropylene/ethylene copolymer. In one aspect the polypropylene/ethylene copolymer has an ethylene content of about 5% to about 20% by weight of copolymer. In another aspect the polypropylene/ethylene copolymer has an ethylene content of about 8% to about 25%. Also, in another aspect, aspect the polypropylene/ethylene copolymer has an ethylene content of about 5% to about 17% by weight of copolymer. In yet another aspect, aspect the polypropylene/ethylene copolymer has an ethylene content of about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25%, or any range therebetween, by weight of copolymer. Still, in another aspect, the polypropylene/ethylene copolymer has an ethylene content of about 16% by weight of copolymer.

In another aspect of the present invention, the monofilament, yarn, tape, or staple fiber is made of a polypropylene composition comprising a melt blended admixture of about 93% by weight of polypropylene, about 5% by weight of a polypropylene copolymer having an ethylene content of about 16% by weight of copolymer, and about 2 wt. % of an additive.

Yet, in another aspect of the present invention, the monofilament, yarn, tape, or staple fiber is made of a polypropylene composition comprising a melt blended admixture of about 94 to about 95% by weight of polypropylene and about 5 to about 6% by weight of the polypropylene/ethylene copolymer described above, and each has a tenacity of at least 0.75 g/Denier at 1% strain, at least 1.5 g/Denier at 2% strain, and at least 3.75 g/Denier at 5% strain. In another aspect such monofilament, yarn, tape, or staple fiber respectively has a tenacity of at least 0.9 g/Denier at 1% strain, at least 1.75 g/Denier at 2% strain, and at least 4 g/Denier at 5% strain. Still, in another aspect such monofilament, yarn, tape, or staple fiber respectively has a tenacity of about 1 g/Denier at 1% strain, about 1.95 g/Denier at 2% strain, and about 4.6 g/Denier at 5% strain.

Yet still, in another aspect of the present invention, the monofilament, yarn, tape, or staple fiber is made of a polypropylene composition comprising a melt blended admixture of about 93% by weight of polypropylene, about 5% by weight of a polypropylene/ethylene copolymer described above, and about 2 wt. % of an additive, and each has a tenacity of at least 0.75 g/Denier at 1% strain, at least 1.5 g/Denier at 2% strain, and at least 3.75 g/Denier at 5% strain. In another aspect such monofilament, yarn, tape, or staple fiber respectively has a tenacity of at least 0.9 g/Denier at 1% strain, at least 1.75 g/Denier at 2% strain, and at least 4 g/Denier at 5% strain. Still, in another aspect such monofilament, yarn, tape, or staple fiber respectively has a tenacity of about 1 g/Denier at 1% strain, about 1.95 g/Denier at 2% strain, and about 4.6 g/Denier at 5% strain.

A process for preparing a slit film tape comprises:
a) preparing a composition comprising about 94 to about 95% by weight of polypropylene and about 5 to about 6% by weight of the polypropylene/ethylene copolymer described above;
b) forming the composition into a film;
c) slitting the film into a tape; and
d) hot-drawing the tape at a temperature below the melting point of the composition and at a draw ratio between 2.5:1 and 25:1 to produce the slit film tape.

In another aspect of the present invention, the process for preparing a slit film tape comprises:
a) preparing a composition comprising about 93% by weight of polypropylene, about 5% by weight of the polypropylene/ethylene copolymer described above, and about 2 wt. % of an additive;
b) forming the composition into a film;
c) slitting the film into a tape; and
d) hot-drawing the tape at a temperature below the melting point of the composition and at a draw ratio between 2.5:1 and 25:1 to produce the slit film tape.

Yet, in another aspect of the present invention, a process for preparing a monofilament comprises:
a) preparing a composition comprising about 94 to about 95% by weight of polypropylene homopolymer and about 5 to about 6% by weight of the polypropylene/ethylene copolymer described above;
b) forming the composition into a filament; and
c) hot-drawing the monofilament at a temperature below the melting point of the homopolymer and at a draw ratio between 2.5:1 and 25:1 to produce the monofilament.

Still, in another aspect of the present invention, a process for preparing a monofilament comprises:
a) preparing a composition comprising about 93% by weight of polypropylene, about 5% by weight of the polypropylene/ethylene copolymer described above, and about 2 wt. % of an additive;
b) forming the composition into a filament; and
c) hot-drawing the monofilament at a temperature below the melting point of the homopolymer and at a draw ratio between 2.5:1 and 25:1 to produce the monofilament.

Polypropylene homopolymers employed in the present invention can be manufactured by any known process. For example, PP polymers can be prepared in the presence of Ziegler-Natta catalyst systems, based on organometallic compounds, e.g. metallocenes, and on solids containing titanium trichloride.

A polypropylene copolymer employed in the present invention is manufactured and sold by ExxonMobil Chemical Company under the name Vistamaxx™ 6201. Vistamaxx™ 6201 is a random copolymer of propylene and ethylene, has a density of 0.862 g/cm3 (ASTM D1505), a melt mass-flow rate of 3.0 g/10 min. (230° C./2.16 kg, ASTM D1238), and an ethylene content of about 16 weight %.

The compositions useful in this invention may optionally further comprise additives commonly employed with polypropylene compositions. Such additives include, but are not limited to, a colorant, a filler, a delustrant, a thermal stabilizer, an ultraviolet light absorber, an ultraviolet light stabilizer, a terminating agent, an antioxidant, a metal deactivator, a phosphite, a phosphonite, a fluorescent whitening agent, a thiosynergist, a peroxide scavenger, a nucleating agent, a plasticiser, a lubricant, an emulsifier, a rheology additive, a catalyst, a flow-control agent, an optical brightener, a flameproofing agent, an antistatic agent, a blowing agent, a benzofuranone, an indolinone, a hydrophilic agent, a hydrophobic agent, an oliophobic agent, an oliophilic agent, or any combination thereof. These conventional additives may be present in the compositions in quantities that are generally from 0.01 to 0.5 weight %, 0.01 to 1 weight %, 0.01 to 1.5 weight %, or 0.01 to 2 weight %.

The optional incorporation of such conventional ingredients into the compositions comprising polypropylene and polypropylene copolymer can be carried out by any known process. This incorporation can be carried out, for example, by dry blending, by extruding a mixture of the various constituents, by the conventional masterbatch technique, adding a concentrate of the additive, adding the additive such as a filler mixed in a polymeric carrier, or the like. Further information about suitable levels of additives and methods of incorporating them into polymer compositions may be found in standard reference texts.

The mechanical properties such as tenacity, tensile breaking load, elongation at break and denier of the films, tapes and fibers of this invention can be balanced by adjusting various parameters including resin formulation design (base resin, level and types of additives such as $CaCO_3$, UV stabilizers, pigment added); amount and type of ethylene copolymer used; processing equipment (quenching, slitting, drawing and annealing configuration); and processing conditions (extruder screw configuration, temperature profile and polymer throughput, stretch and annealing temperatures and profiles, line speed, etc).

The compositions of the present invention are suitable for preparation of films by any means of processing that is suitable for thermoplastic compositions. Extrusion processing is a typical method. The films are useful in a wide variety of packaging applications, including shrink film, and for preparing slit film tapes.

A film can be either a single layer or multilayer polymeric film. The multilayered films comprise more than one layer including, for example, tie layers, which may or may not include the polypropylene and ethylene copolymer that define the films and fibers of the invention, provided that the presence of the other layers does not negate the favorable properties of the layer or layers comprising the polypropylene and ethylene copolymer. Methods of forming multilayered film structures, by casting or coextrusion, e.g., are well known in the art. Various additives as generally practiced in the art, such as those mentioned above, can be present in any layer or layers of the multilayered film structures, again provided that their presence does not negate the properties of the film of the invention.

Films can be made by virtually any method of extrusion processing known to those skilled in this art. For example, a primary film may be manufactured by extruding the said compositions using so-called "blown film" or "flat die" methods. A blown film is prepared by extruding the polymeric composition through an annular die and expanding the resulting tubular film with an air current to provide a blown film. Cast flat films are prepared by extruding the composition through a flat die. The film leaving the die is cooled by at least one roll containing internally circulating fluid (a chill roll) or by a water bath to provide a cast film. A film of this invention would have a width, for example, of about 60 cm (two feet).

A film can be further oriented beyond the immediate quenching or casting of the film. The process comprises the steps of extruding a laminar flow of molten polymer, quenching the extrudate and orienting the quenched extrudate in at least one direction. "Quenched" describes an extrudate that has been substantially cooled below its melting point in order to obtain a solid film material.

The film may be uniaxially oriented, or biaxially oriented by drawing in two mutually perpendicular directions in the plane of the film to achieve a satisfactory combination of mechanical and physical properties. Films may be drawn at temperatures below the melting point of the neat polypropylene. The drawing ratio may generally be about 2.5:1 or greater, about 5.5:1 or greater, about 6:1 or greater, about 12:1 or greater, or about 25:1 or greater. The draw ratio may be in the range of 2.5:1 to about 12:1. The draw ratio may be in the range of 6:1 to about 12:1.

Those skilled in the art are aware that, in general, the maximum possible draw ratio cannot be reached along both axes, when orienting a film biaxially. Accordingly, the draw ratio of a biaxially oriented film is defined herein as the product of the draw ratio along each axis.

Orientation and stretching apparatus to uniaxially or biaxially stretch film are known in the art and may be adapted by those skilled in the art to produce films of the present invention. Examples of such apparatus and processes include, for example, those disclosed in U.S. Pat. Nos. 3,278,663; 3,337,665; 3,456,044; 4,590,106; 4,760,116; 4,769,421; 4,797,235 and 4,886,634.

The film can be formed by an extrusion process that causes the polymer chains in the film to be generally aligned in the direction of extrusion. Linear polymers, after being highly oriented uniaxially possess considerable strength in the orientation direction, but less strength in the transverse direction. This alignment can add strength to the film in the direction of extrusion, which corresponds to the length dimension of the slit film yarns.

Slit film tapes, also referred to as slit film fibers, can be prepared from films disclosed herein. Tapes can be those prepared from the films above. The film may be drawn after quenching and prior to slitting. The slit film tapes can be produced with a slitting apparatus that comprises a support frame; a plurality of substantially planar cutting blades, each of which includes opposed cutting edges and opposed ends; a mounting structure for mounting the cutting blades to the support frame; and a feed roll attached to the support frame and configured to feed film in a downstream direction over the exposed cutting edges of the blades. The mounting structure is configured to mount the cutting blades in substantially aligned, parallel and spaced apart relationship, wherein the blades are mounted such that each blade has one of its cutting edges exposed for cutting, and wherein the cutting edges of adjacent blades are spaced apart from each other.

After slitting the film into tapes as described above, the drawing operation can be done over a span of from 3 to 6 meters (ten to twenty feet) in an oven heated to a temperature effective to soften the film so as to facilitate the drawing operation. What typically takes place is that the film is cold at the beginning of the path through the oven and is progressively heated and softened as it passes through the oven. Necking takes place at a neckline that is at a certain distance from the entrance to the oven. The location of the necking zone depends on a number of factors including the rate of stretching, the temperature of the oven, and the nature and thickness of the film material. A typical pre-stretched tape may have, for example, a thickness about 120 microns (μm) and a width of about 6 cm to about 8 cm. After stretching, the final tape has a thickness of about 30 to 50 μm and a width of about 2.5 cm to about 3 cm. Tapes can be made wider or narrower for certain purposes. For example, fibers for reduced end count woven fabric can have a final width of from about 4 mm to about 6 mm; polypropylene strapping can have a final width of about 10 mm to 15 mm.

After hot-drawing, the resulting monofilament fibers for woven tape typically can have a denier of from about 700 to about 1700. Polypropylene strapping can have a denier of from about 3000 to about 6000. The distance over which longitudinal drawing takes place will vary with the technique used. In the short-draw the stretching takes place over a distance of a few inches, other techniques involve much greater distances.

Fibers prepared as described herein, including slit film tape, are useful for preparing cords, twines or ropes. A number of fibers are joined together by, for example, twisting, braiding, interlacing and the like to form a cord. Twines, in general, contain a lower number of fibers and are smaller in diameter than ropes. These cords, twines or ropes may be roughly circular or flattened in cross section. Cords and twines can be used for shoelaces, straps for bags, briefcases and the like, and can be used in packaging applications. Ropes can be used in a wide variety of industrial and marine applications. Cords, twines and ropes may also be further interlaced (such as by knitting) to prepare nets having a relatively open structure, such as fishing nets, cargo nets and the like.

Slit film tape of the present invention can be used as monofilament fibers for carpet tufting, synthetic lawns, matting, geosynthetics, and the like. They can also be used as strapping. When an adhesive is applied they can be used as adhesive tapes for uses such as strapping, in furniture or bonding materials together.

Woven or knitted textiles can be prepared from the slit film tape as described above. In general, woven fabrics may have a tighter construction than knitted fabrics.

Polypropylene yarns prepared as described herein can be woven into fabrics used in applications such as filters, tarpaulins, sails, boat tops, covers, awnings, tents, escape slides, canopies, banners, construction (e.g. roofing) membranes, machine belts, liners for luggage or packaging, heavy duty sacking, carpet backing, book covers, footwear, upholstery for use in home furniture, motor vehicles, boats, aircraft and the like, apparel, agrotextiles (for use in seed control, weed control, gardening, greenhouses and silage) and geotextiles (for erosion control and soil conservation). Knitted fabrics can be used for sacking for use in carrying bulky materials such as groceries, firewood and the like; and construction and industrial netting.

Additives

As indicated above, colorant's can be employed in the yarns/fibers of the present invention. Colorants include inorganic pigments, organic pigments, and dyes. Examples of inorganic pigments include, but are not limited to, titanium dioxide, zinc oxide, zinc ferrite, carbon black, cadmium sulfide, cadmium selenide, chromium oxide, iron oxide, lead oxide, lead chromates, and bismuth vanadate. Examples of organic pigments include, but are not limited to, azo and azo-condensation pigments, anthraquinones, phthalocyanines, tetrachloroisoindolinones, quinacridones, isoindolines, perylenes, pyrrolopyrroles, and metal complex pigments. All pigments described in "Gachter/Muller: Plastics Additives Handbook, 3rd Edition, Hanser Publishers, Munich Vienna New York", page 647 to 659, point 11.2.1.1 to 11.2.4.2 can be used in the present invention. There are many conventional dyes well known in the art which can be employed with polypropylene. Such dyes can be found in the known references and various product sheets produced by the dye manufacturers. The amount of a respective dye to be blended or mixed with the polypropylene is in accordance with the manufacturer's instructions.

The UV light absorbers/stabilizers known in the art can be employed with the present invention. Examples of UV light absorbers/stabilizers include, but are not limited to, 2-(2'-hydroxyphenyl)benzotriazoles, 2-hydroxybenzophenones, esters of substituted or unsubstituted benzoic acid, acrylates, oxamides, 2-(2-hydroxyphenyl)-1,3,5-triazines, monobenzoates of resorcinol, formamidines, nickel compounds, and sterically hindered amines.

The yarn of the present invention can optionally include antioxidants. Such antioxidants include, but are not limited to, alkylated monophenols; alkylthiomethylphenols; hydroquinones and alkylated hydroquinones; tocopherols; hydroxylated thiodiphenyl ethers; alkylidenebisphenols; O-, N-, and S-benzyl compounds; hydroxybenzylated malonates; aromatic hydroxybenzyl compounds; triazine compounds; benzylphosphonates; acylaminophenols; esters of β-(3,5-di-tert-butyl-4-hydroxyphenyl)propionic acid with mono- or polyhydric alcohols; esters of β-(5-tert-butyl-4-hydroxy-3-methylphenyl)propionic acid with mono- or poly-hydric alcohols; esters of β-(3,5-dicyclohexyl-4-hydroxyphenyl)propionic acid with mono- or polyhydric alcohols; esters of 3,5-di-tert-butyl-4-hydroxyphenyl acetic acid with mono- or polyhydric alcohols; amides of β-(3,5-di-tert-butyl-4-hydroxyphenyl)propionic acid; ascorbic acid (vitamin C); and aminic antioxidants. Such antioxidants are known in the art.

O-, N-, and S-benzyl compounds include, but are not limited to, 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxy-benzyl) sulfide, and isooctyl-3,5-di-tert-butyl-4-hydroxybenzylmercaptoacetate.

Aromatic hydroxybenzyl compounds include, but are not limited to, 1,3,5-tris(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, and 2,4,6-tris(3,5-di-tert-butyl-4-hydroxybenzyl)phenol.

Triazine compounds include, but are not limited to, 24-bis(octylmercapto)-6-(3,5-di-tert-butyl-4-hydroxy-anilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris-(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, and 1,3,5-tris(3,5-dicyclohexyl-4-hydroxybenzyl) isocyanurate.

The yarn of the present invention can optionally include metal deactivators. Metal deactivators include, but are not limited to, N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, and N,N'-bis(salicyloyl)thiopropionyl dihydrazide.

The yarn of the present invention can optionally include phosphites and phosphonites. Phosphites and phosphonites include, but are not limited to, triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosph-ocin, bis(2,4-di-tert-butyl-6-methylphenyl)methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosp-hocin, 2,2',2"-nitrilo-[triethyltris(3,3',5,5'-tetra-tert-butyl-1,1'-biph-enyl-2,2'-diyl)phosphite], 2-ethylhexyl(3,3',5,5'-tetra-tert-butyl-1,1'-biphenyl-2,2'-diyl)phosphite, and 5-butyl-5-ethyl-2-(2,4,6-tri-tert-butyl-phenoxy)-1,3,2-dioxaphosphirane.

The yarn of the present invention can optionally include thiosynergists. Thiosynergists include, but are not limited to, dilauryl thiodipropionate, dimistryl thiodipropionate, distearyl thiodipropionate or distearyl disulfide.

The yarn of the present invention can optionally include peroxide scavengers. Peroxide scavengers include, but are not limited to, esters of β-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, and pentaerythritol tetrakis(β-dodecylmercapto)propionate.

The yarn of the present invention can optionally include nucleating agents. Nucleating agents include, but are not limited to, inorganic substances, such as talcum, metal oxides, such as titanium dioxide or magnesium oxide, phosphates, carbonates or sulfates of alkaline earth metals; organic compounds, such as mono- or polycarboxylic acids and the salts thereof, e.g. 4-tert-butylbenzoic acid, adipic acid, diphenylacetic acid, sodium succinate or sodium benzoate; and polymeric compounds, such as ionic copolymers (ionomers).

A further embodiment of the present invention relates to an article comprising a multifilament or yarn, a monofilament, a staple fiber, or a tape as defined above. Examples of such articles include, but are not limited to, carpet, carpet backing, geotextiles, artificial turf, a nonwoven fabric, a woven fabric, and a knitted fabric.

Process

Figure 1:
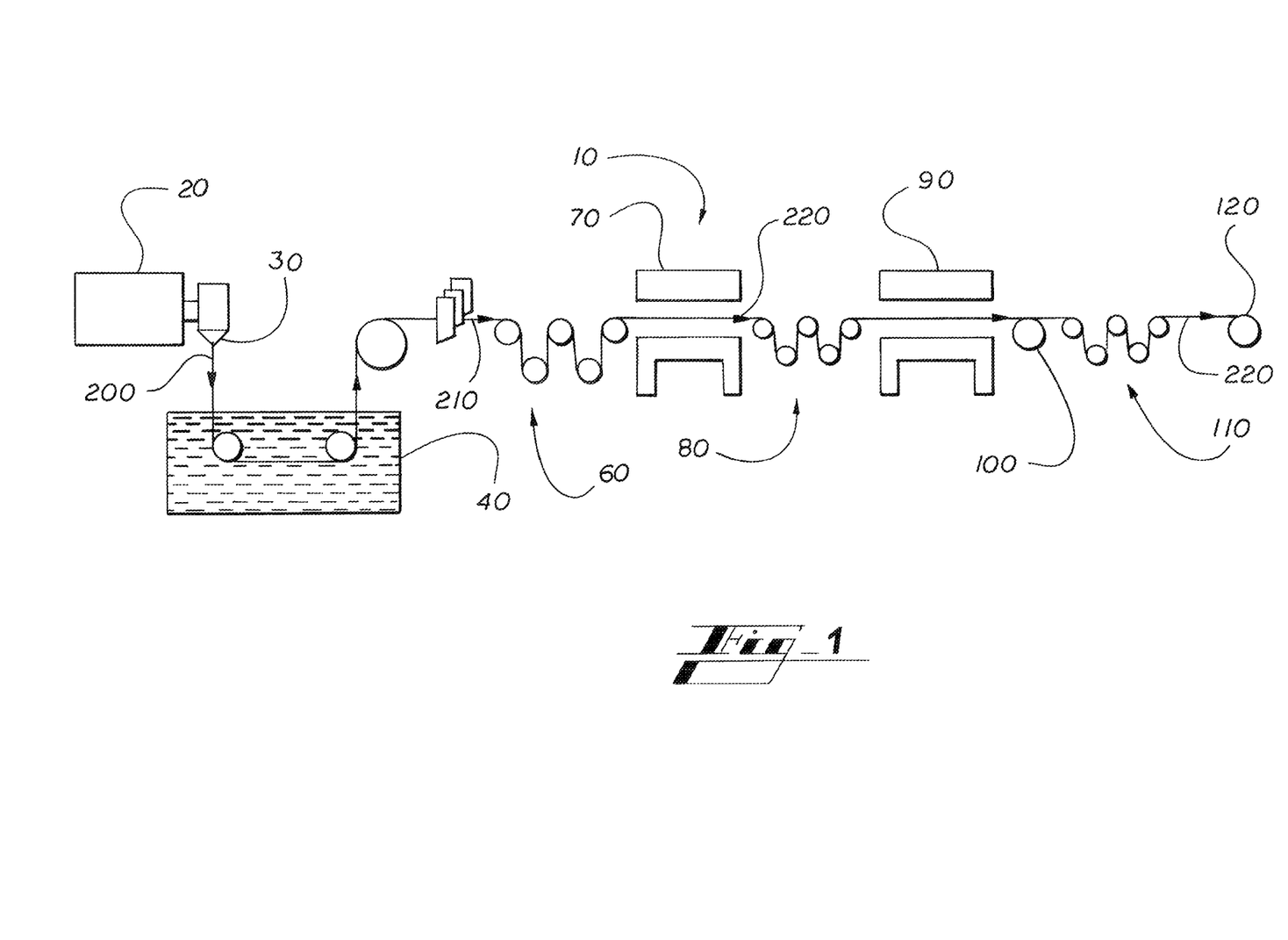
FIG. 1 is a schematic diagram of a process in accordance with the present invention.

FIG. 1 schematically illustrates a process 10 to manufacture a slit film tape 220 in accordance with the present invention. Polypropylene, polypropylene copolymer, and any of the optional additives are melt blended within extruder 20 and passed through die 30 to form a film 200. Alternatively, the blended polymer can be formed into pellets for use at a later time. The types and availability of dies for use in forming films are well known in the art. For example, the die can have a die opening of from about 10 to 30 mils to form a film of similar thickness. Upon extrusion through die 30, the film 200 is typically quenched in a water bath 40 (typically about 70 to 110° F.) or otherwise cooled, such as by the use of cooling rollers (not shown).

After quenching, the film 200 is slit longitudinally into one or more tape segments or slit film tapes 210. This is usually accomplished through the use of slitter 50. Slitter 50 can have a plurality of blades spaced laterally apart at generally equal distances. The tapes 210 are typically slit into widths of from about 0.25 to about 2 inches, more usually from about 0.5 to about 1 inch, but may vary depending upon the application for which the tapes will be used.

The slit film tapes 210 are then drawn or stretched in the machine or longitudinal direction. This is usually accomplished through the use of rollers or godets set at different rotational speeds to provide a desired draw ratio. A draw oven for heating of the slit film tape to facilitate this drawing step may be provided. Alternatively, heated rollers (not shown) can be employed to heat the slit film tape 210. As illustrated in FIG. 1, the slit film tape proceeds through a set of godets 60 prior to entering the draw oven 70. Godets 60 maintain film speed of the slit film tape 210 as it enters the draw oven 70. As discussed above the draw ratios are usually from about 5.5:1 to about 25:1, with from about 6:1 to about 12:1 being more typical. In another aspect, the draw ratios are from about 10.5:1 to about 15:1. Drawing of the slit film tapes orients the polymer molecules and increases the tensile strength of the tapes. The final thickness of the drawn tapes is typically from 0.5 mils to 5 mils, with from 1 to 3 mils being more typical. The width of the drawn tapes is typically from about 0.025 inches to about 0.70 inches, with from about 0.05 inches to about 0.4 inches being more typical.

After the slit film tapes 220 are drawn, optionally, they can be annealed in an annealing oven 90 or on annealing godets (not shown). Annealing reduces internal stresses caused by drawing or stretching of the tape and reduces tape shrinkage. Further, the tapes can be fibrillated by fibrillator 100, if desired. It is not required for the tapes to be fibrillated. As illustrated, another set of godets 110 is provided to maintain a substantially constant film speed prior to winding. After the slit film tape exits godets 110, the tapes are wound onto bobbins 120.

Tapes may be individually extruded as well in a direct extrusion process. Dyes utilized for extruding a plurality of tapes are well known in the art. In such a process, instead of slitting a plurality of tapes from a film, a plurality of individual tapes are extruded through multiple die openings. Thus, in this aspect of the invention, splitter 50 is not present.

Additionally, in accordance with the present invention, monofilaments can be extruded in a direct extrusion process. Such dyes are well known in the art. In this aspect of the invention, the process is substantially similar to the process described above for slit film tapes. However, the process for making monofilaments would not include splitter 50 nor fibrillator 100. Multifilaments can then be conventionally formed from the monofilaments. Similarly, staple fiber can be formed by cutting the monofilaments or multifilaments into desired lengths for use in manufacturing nonwoven fabrics.

Oriented films comprising polypropylene can be formed from the molten polymer by a number of methods known in the art. For example, in cast film extrusion, flat films can be extruded into a cooling water bath or onto chilled rolls for quenching. Alternatively, in blown film extrusion a tubular blown film can be extruded through an annular die and air-quenched. Films can be oriented in one direction by hot-drawing with a tensioning device, and annealing. Films can also be oriented in two directions (machine direction and transverse direction) by suitable tensioning devices. Oriented polypropylene films are useful for a wide variety of packaging applications.

As indicated above, fibers comprising the polypropylene composition of the present invention can be formed directly from the molten polymer by a number of methods known in the art, including melt-spinning, centrifugal spinning and melt-blowing. These methods typically produce fibers that are at least partially oriented.

Melt spun fibers can be incorporated into nonwoven textiles by many technologies, including dry laid, wet laid, air laid, spunbond, spunlace, and needlepunch processes. The nonwovens so produced can be used in a wide range of applications including apparel, carpet backing, agrotextiles and geotextiles.

Melt spun fibers can be incorporated into nonwoven textiles by many technologies, including dry laid, wet laid, air laid, spunbond, spunlace, and needlepunch processes. The nonwovens so produced can be used in a wide range of applications including apparel, carpet backing, agrotextiles and geotextiles.

The monofilament, yarn, tape, or staple fiber of the present invention has an improved Young's modulus as compared to monofilament, yarn, tape, or staple fiber made from neat polypropylene homopolymer. Young's modulus (E), also known as the modulus of elasticity, is a measure of the stiffness of an isotropic elastic material. It is defined as the ratio of the uniaxial stress over the uniaxial strain in the range of stress in which Hooke's Law holds. This can be experimentally determined from the slope of a stress-strain curve created during tensile tests conducted on a sample of the material. See International Union of Pure and Applied Chemistry, "Modulus of Elasticity (Young's modulus), E", Compendium of Chemical Terminology, Internet edition.

Young's modulus, E, can be calculated by dividing the tensile stress by the tensile strain as follows:

$$E \equiv \frac{\text{tensil stress}}{\text{tensil strain}} = \frac{\sigma}{\varepsilon} = \frac{F/A_0}{\Delta L/L_0} = \frac{FL_0}{A_0 \Delta L}$$

wherein:
  E is the Young's modulus (modulus of elasticity),
  F is the force applied to the object,
  $A_0$ is the original cross-sectional area through which the force is applied,
  $\Delta L$ is the amount by which the length of the object changes, and
  $L_0$ is the original length of the object.

The monofilament, yarn, tape, or staple fiber of the present invention has a Young's modulus greater than 3.5. In another aspect of the present invention, the monofilament, yarn, tape, or staple fiber of the present invention has a Young's modulus of at least 4 GPa, at least 4.5 GPa, at least 5 GPa, at least 5.5 GPa, at least 6 GPa, at least 6.5 GPa, or at least 6.9 GPa, as determined in accordance with ASTM D2256.

Percent improvement in Young's modulus for a yarn is defined as:

% Improvement=$((YM^{invent}-YM^{conv})/YM^{conv}) \times 100$;

where $YM^{invent}$ is the Young's Modulus for the inventive monofilament, yarn, tape, or staple fiber, and $YM^{conv}$ is the Young's Modulus for the conventional yarn of like cross-sectional shape and Denier as the inventive yarn. Conventional yarn is defined as a mono filament, yarn, tape, or staple fiber made of a polypropylene homopolymer composition void of polypropylene/ethylene copolymer.

The monofilament, yarn, tape, or staple fiber of the present invention has a percent improvement in Young's modulus of at least 10% over a conventional monofilament, yarn, tape, or staple fiber of like cross-sectional shape and Denier as the inventive yarn. In another aspect, the monofilament, yarn, tape, or staple fiber of the present invention has a percent improvement in Young's modulus of at least 15% over a conventional monofilament, yarn, tape, or staple fiber of like cross-sectional shape and Denier as the inventive yarn. Yet, in another aspect, the monofilament, yarn, tape, or staple fiber of the present invention has a percent improvement in Young's modulus of at least 20% over a conventional monofilament, yarn, tape, or staple fiber of like cross-sectional shape and Denier as the inventive yarn. Still, in another aspect, the monofilament, yarn, tape, or staple fiber of the present invention has a percent improvement in Young's modulus of at least 25% over a conventional monofilament, yarn, tape, or staple fiber of like cross-sectional shape and Denier as the inventive yarn. Yet still, in another aspect, the monofilament, yarn, tape, or staple fiber of the present invention has a percent improvement in Young's modulus of at least 30% over a conventional monofilament, yarn, tape, or staple fiber of like cross-sectional shape and Denier as the inventive yarn. Still yet, in another aspect, the monofilament, yarn, tape, or staple fiber of the present invention has a percent improvement in Young's modulus of at least 35% over a conventional monofilament, yarn, tape, or staple fiber of like cross-sectional shape and Denier as the inventive yarn. Moreover, in another aspect, the monofilament, yarn, tape, or staple fiber of the present invention has a percent improvement in Young's modulus of at least 40% over a conventional monofilament, yarn, tape, or staple fiber of like cross-sectional shape and Denier as the inventive yarn.

EXAMPLES

Example 1

Figure 2:
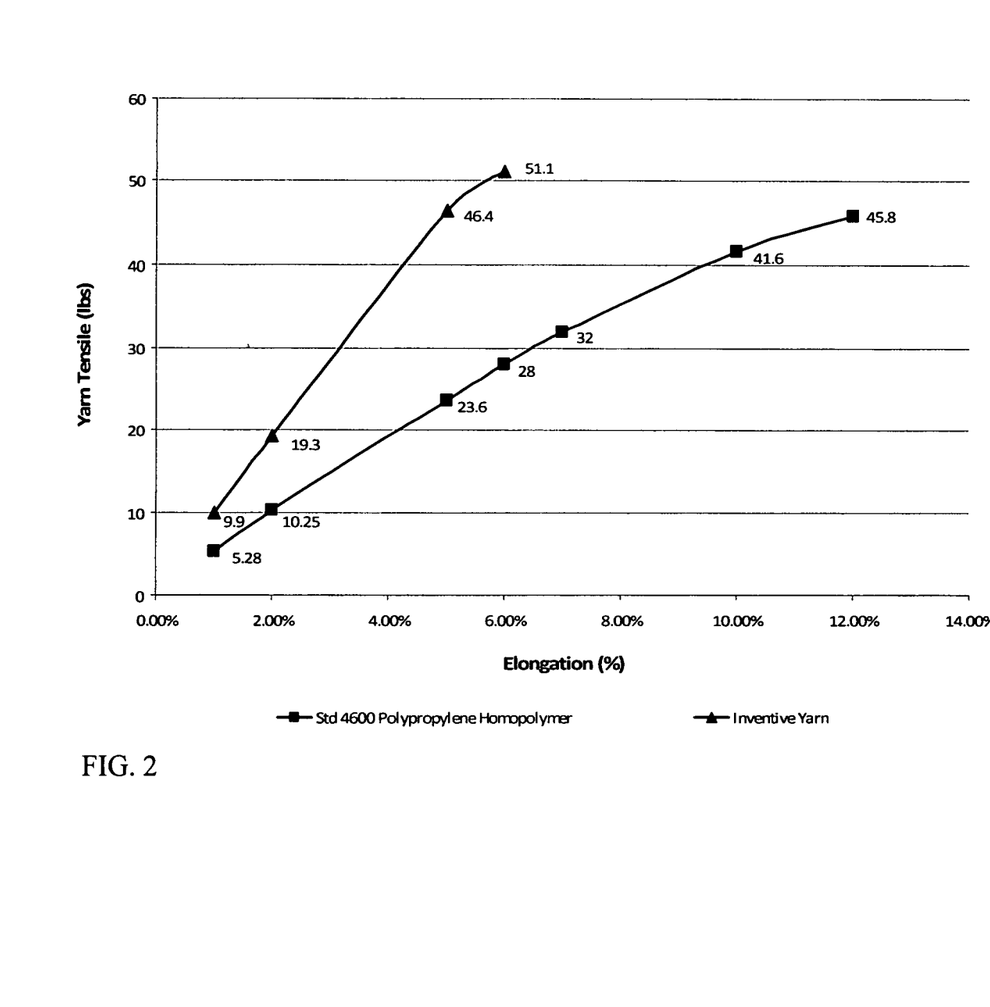
FIG. 2 is a graph comparing yarn tensile strength of a 4600 Denier yarn in accordance with the present invention to a conventional 4600 Denier polypropylene homopolymer yarn.

A 4600 Denier fibrillated slit tape yarn was made in accordance with the process described above comprising a melt blended admixture of about 93 wt. % polypropylene homopolymer, about 5 wt. % Vistamaxx 6102 and about 2 wt. % carbon black. The draw ratio employed was 12.5:1. Also, a conventional 4600 Denier fibrillated slit tape yarn comprising 98% polypropylene homopolymer and about 2 wt. % carbon black was made using the process described above. The draw ratio employed was 6:1. Young's modulus was determined for each yarn in accordance with ASTM D2256. FIG. 2 is a graph showing the results of the test. It was determined that the conventional polypropylene yarn had a Young's modulus of 3.5 GPa, whereas the inventive yarn had a Young's modulus of 6.9 GPa, an improvement of 97.1%.

The tensile strength was also determined for these yarns during the determination of Young's modulus. The ultimate elongation of the inventive yarn was approximately 5%. Table 2 provides the results:

TABLE 2

| Strain % | Conventional Yarn, lb/in | Inventive Yarn, lb/in |
|---|---|---|
| 1/5 | 28 | 90 |
| 1 | 50 | 160 |
| 2 | 105 | 300 |
| 4 | 255 | 500 |
| 5 | 320 | 570 |

Tenacity was determined for these yarns during the determination of Young's modulus. Table 3 provides the results.

TABLE 3

| Yarn | Tenacity @ 1% Strain, g/Denier | Tenacity @ 2% Strain, g/Denier | Tenacity @ 5% Strain, g/Denier | Ultimate Elongation (%) |
|---|---|---|---|---|
| 4600 Denier PP | 0.52 | 1.02 | 2.34 | 12.00 |
| 4600 Denier Inventive | 1.00 | 1.95 | 4.68 | 5.65 |

Example 2

A plain weave fabric was made employing 680 denier tape yarn made in accordance with the present invention. The tape yarn comprised, by weight of the extruded yarn, 92.8% polypropylene resin, 5% VISTAMAXX 6201, 2% calcium carbonate, and 0.2% carbon black. The tape was formed with a draw ratio of 8:1 and had a 0.002 inch thickness and 0.060 width. The tape was employed in both the warp and weft directions of the fabric. The fabric had 15.7 ends/inch and 14.2 picks/inch. The fabric met the standards listed in Table 1.

Example 3

Figure 3:
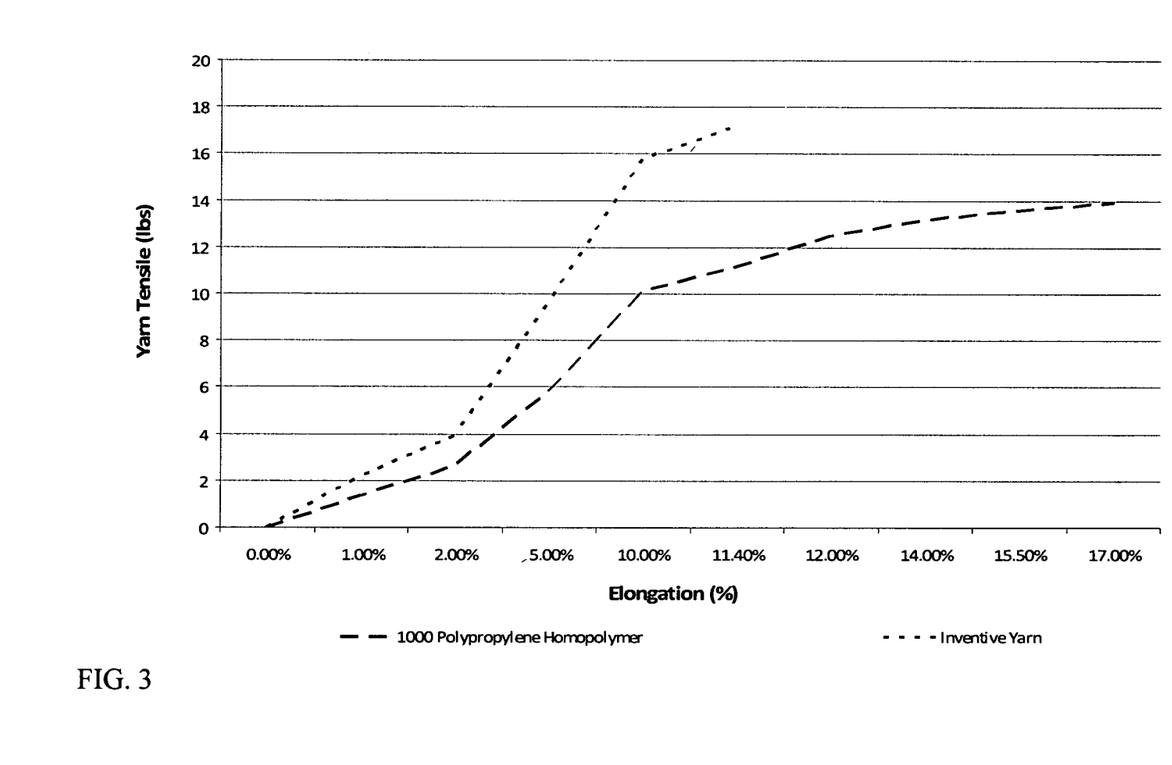
FIG. 3 is a graph comparing yarn tensile strength of a 1000 Denier yarn in accordance with the present invention to a conventional 1000 Denier polypropylene homopolymer yarn.

A 1000 Denier yarn having an oval-shaped cross-section was made in accordance with the process described above comprising a melt blended admixture of about 93 wt. % polypropylene homopolymer, about 5 wt. % Vistamaxx 6102 and about 2 wt. % carbon black. The draw ratio employed was 12:1. Also, a conventional 1000 Denier yarn having an oval-shaped cross-section comprising 98% polypropylene homopolymer and about 2 wt. % carbon black was made using the process described above. The draw ratio employed was 8:1. Young's modulus was determined for each yarn in accordance with ASTM D2256. FIG. 3 is a graph showing the results of the test. It was determined that the conventional 1000 Denier polypropylene yarn had a Young's modulus of 4.03 GPa, whereas the inventive 1000 Denier yarn had a Young's modulus of 5.73 GPa, an improvement of 42.2%. The tensile strength was also determined for these yarns during the determination of Young's modulus. Conventional 1000 Denier yarn had a tensile of 13.9 lbs., and inventive 1000 Denier yarn had a tensile of 17.2 lbs.

Tenacity was determined for these yarns during the determination of Young's modulus. Table 4 provides the results.

TABLE 4

| Yarn | Tenacity @ 1% Strain, g/Denier | Tenacity @ 2% Strain, g/Denier | Tenacity @ 5% Strain, g/Denier | Ultimate Elongation (%) |
|---|---|---|---|---|
| 1000 Denier PP | 1.4 | 2.6 | 5.8 | 16.8 |
| 1000 Denier Inventive | 2.2 | 3.9 | 9.7 | 11.4 |

Example 4

Figure 4:
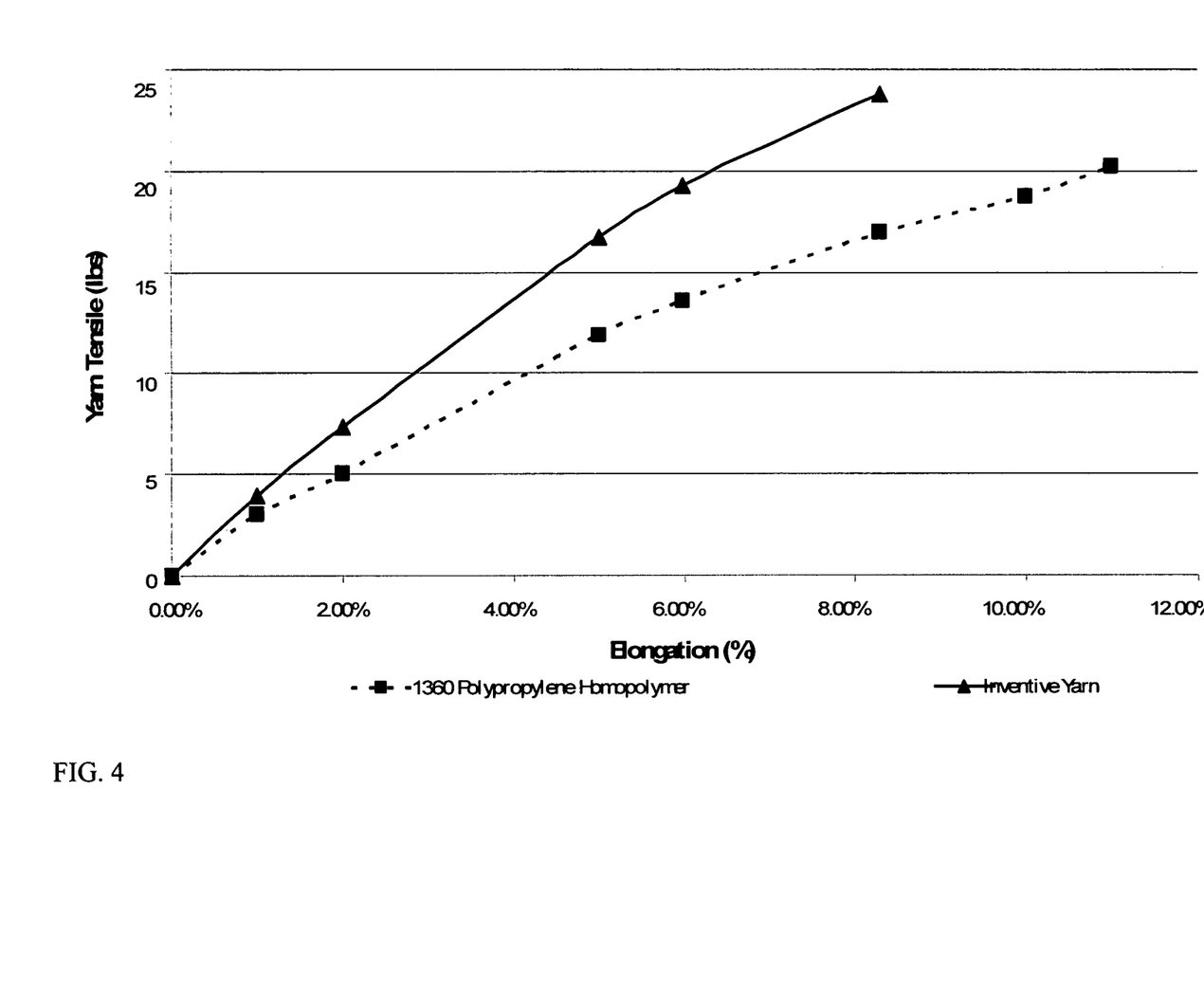
FIG. 4 is a graph comparing yarn tensile strength of a 1360 Denier yarn in accordance with the present invention to a conventional 1360 Denier polypropylene homopolymer yarn.

A 1371 Denier yarn having an oval-shaped cross-section was made in accordance with the process described above comprising a melt blended admixture of about 93 wt. % polypropylene homopolymer, about 5 wt. % Vistamaxx 6102 and about 2 wt. % carbon black. The draw ratio employed was 14.5:1. Also, a conventional 1371 Denier yarn having an oval-shaped cross-section comprising 98% polypropylene homopolymer and about 2 wt. % carbon black was made using the process described above. The draw ratio employed was 10:1. Young's modulus was determined for each yarn in accordance with ASTM D2256. FIG. 4 is a graph showing the results of the test. It was determined that the conventional 1371 Denier polypropylene yarn had a Young's modulus of 7.7 GPa, whereas the inventive 1371 Denier yarn had a Young's modulus of 10.8 GPa, an improvement of 40.2%. The tensile strength was also determined for these yarns during the determination of Young's modulus. Conventional 1371 Denier yarn had a tensile of 20.2 lbs., and inventive 1371 Denier yarn had a tensile of 24.1 lbs.

Tenacity was determined for these yarns during the determination of Young's modulus. Table 5 provides the results.

TABLE 5

| Yarn | Tenacity @ 1% Strain, g/Denier | Tenacity @ 2% Strain, g/Denier | Tenacity @ 5% Strain, g/Denier | Ultimate Elongation (%) |
|---|---|---|---|---|
| 1371 Denier PP | 3.0 | 5.0 | 11.9 | >11.0 |
| 1371 Denier Inventive | 3.8 | 6.8 | 15.5 | <9.0 |

With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A monofilament, a yarn, or a tape, each having a draw ratio of about 11.5 to about 25:1 and comprising:
   a melt blended admixture of about 94 to about 95% by weight of polypropylene and about 5 to about 6% by weight of a polypropylene/ethylene copolymer having an ethylene content of 8% to 25% by weight of copolymer;
   wherein the monofilament, yarn, or tape respectively is a homogenous construction and has a Young's modulus greater than 3.5 GPa.

2. The monofilament, yarn, or tape of claim 1, wherein each has a tenacity greater than 0.6 g/Denier at 1% strain.

3. A monofilament, a yarn, or a tape, each having a draw ratio of about 11.5 to about 25:1 and comprising:
   a melt blended admixture of about 93% by weight of polypropylene, about 5% by weight of a polypropylene/ethylene copolymer having an ethylene content of 8% to 25% by weight of copolymer, and about 2 wt. % of an additive;
   wherein the monofilament, yarn, or tape respectively is a homogenous construction and has a Young's modulus greater than 3.5 GPa.

4. The monofilament, yarn, or tape of claim 3, wherein each has a tenacity greater than 0.6 g/Denier at 1% strain.

5. The monofilament, yarn, or tape of claim 3, wherein the additive is a colorant, a filler, a delustrant, a thermal stabilizer, an ultraviolet light absorber, an ultraviolet light stabilizer, a terminating agent, an antioxidant, a metal deactivator, a phosphite, a phosphonite, a fluorescent whitening agent, a thiosynergist, a peroxide scavenger, a nucleating agent, a plasticiser, a lubricant, an emulsifier, a rheology additive, a catalyst, a flow-control agent, an optical brightener, a flameproofing agent, an antistatic agent, a blowing agent, a benzofuranone, an indolinone, a hydrophilic agent, a hydrophobic agent, an oliophobic agent, an oliophilic agent, or any combination thereof.

6. The monofilament, yarn, or tape of claim 3, wherein the additive is carbon black.

7. A process for preparing a slit film tape comprising:
   a) preparing a composition comprising about 94 to about 95% by weight of polypropylene and about 5 to about 6% by weight of a polypropylene/ethylene copolymer having an ethylene content of 8% to 25% by weight of copolymer;
   b) forming the composition into a film;
   c) slitting the film into a tape; and
   d) hot-drawing the tape at a temperature below the melting point of the composition and at a draw ratio between about 11.5 and about 25:1 to produce the slit film tape with a homogenous construction and a Young's modulus greater than 3.5 GPa.

8. The process of claim 7, wherein the draw ratio is about 12:1.

9. The process of claim 7, further comprising annealing the slit film tape.

10. The process of claim 7, further comprising fibrillating the slit film tape.

11. A process for preparing a slit film tape comprising:
    a) preparing a composition comprising about 93% by weight of polypropylene, about 5% by weight of a polypropylene/ethylene copolymer having an ethylene content of 8% to 25% by weight of copolymer, and about 2 wt. % of an additive;
    b) forming the composition into a film;
    c) slitting the film into a tape; and
    d) hot-drawing the tape at a temperature below the melting point of the composition and at a draw ratio between about 11.5 and about 25:1 to produce the slit film tape with a homogenous construction and a Young's modulus greater than 3.5 GPa.

12. The process of claim 11, wherein the draw ratio is about 12:1.

13. The process of claim 11, further comprising annealing the slit film tape.

14. The process of claim 11, further comprising fibrillating the slit film tape.

15. The process of claim 11, wherein the additive is a colorant, a filler, a delustrant, a thermal stabilizer, an ultraviolet light absorber, an ultraviolet light stabilizer, a terminating agent, an antioxidant, a metal deactivator, a phosphite, a phosphonite, a fluorescent whitening agent, a thiosynergist, a peroxide scavenger, a nucleating agent, a plasticiser, a lubricant, an emulsifier, a rheology additive, a catalyst, a flow-control agent, an optical brightener, a flameproofing agent, an antistatic agent, a blowing agent, a benzofuranone, an indolinone, a hydrophilic agent, a hydrophobic agent, an oliophobic agent, an oliophilic agent, or any combination thereof.

16. The process of claim 11, wherein the additive is carbon black.

17. A process for preparing a monofilament comprising:
   a) preparing a composition comprising about 94 to about 95% by weight of polypropylene homopolymer and about 5 to about 6% by weight of a polypropylene/ethylene copolymer having an ethylene content of 8% to 25% by weight of copolymer;
   b) forming the composition into a filament; and
   c) hot-drawing the monofilament at a temperature below the melting point of the homopolymer and at a draw ratio between about 11.5 and about 25:1 to produce the monofilament with a homogenous construction and a Young's modulus greater than 3.5 GPa.

18. A process for preparing a monofilament comprising:
   a) preparing a composition comprising about 93% by weight of polypropylene, about 5% by weight of a polypropylene/ethylene copolymer having an ethylene content of 8% to 25% by weight of copolymer, and about 2 wt. % of an additive;
   b) forming the composition into a filament; and
   c) hot-drawing the monofilament at a temperature below the melting point of the homopolymer and at a draw ratio between about 11.5 and about 25:1 to produce the monofilament with a homogenous construction and a Young's modulus greater than 3.5 GPa.

19. The process of claim 18, wherein the additive is a colorant, a filler, a delustrant, a thermal stabilizer, an ultraviolet light absorber, an ultraviolet light stabilizer, a terminating agent, an antioxidant, a metal deactivator, a phosphite, a phosphonite, a fluorescent whitening agent, a thiosynergist, a peroxide scavenger, a nucleating agent, a plasticiser, a lubricant, an emulsifier, a rheology additive, a catalyst, a flow-control agent, an optical brightener, a flameproofing agent, an antistatic agent, a blowing agent, a benzofuranone, an indolinone, a hydrophilic agent, a hydrophobic agent, an oliophobic agent, an oliophilic agent, or any combination thereof.

20. The process of claim 18, wherein the additive is carbon black.

21. A monofilament, a yarn, or a tape, each having a draw ratio of about 11.5 to about 25:1 and a tenacity of at least 0.75 g/Denier at 1% strain, at least 1.5 g/Denier at 2% strain, and at least 3.75 g/Denier at 5% strain, and comprising:
   a melt blended admixture of about 94 to about 95% by weight of polypropylene and about 5 to about 6% by weight of a polypropylene/ethylene copolymer having an ethylene content of about 8% to about 25% by weight of copolymer;
   wherein the monofilament, yarn, or tape respectively is a homogenous construction.

22. The monofilament, a yarn, or a tape as claimed in claim 21, wherein the polypropylene/ethylene copolymer has an ethylene content of 9% to about 24% by weight of copolymer.

23. The monofilament, yarn, or tape of claim 21, wherein each has a tenacity of at least 0.9 g/Denier at 1% strain, at least 1.75 g/Denier at 2% strain, and at least 4 g/Denier at 5% strain.

24. The monofilament, yarn, or tape of claim 21, wherein each has a tenacity of about 1 g/Denier at 1% strain, about 1.95 g/Denier at 2% strain, and about 4.6 g/Denier at 5% strain.

25. A monofilament, a yarn, or a tape, each having a draw ratio of about 11.5 to about 25:1 and a tenacity of at least 0.75 g/Denier at 1% strain, at least 1.5 g/Denier at 2% strain, and at least 3.75 g/Denier at 5% strain, and comprising:
   a melt blended admixture of about 93% by weight of polypropylene, about 5% by weight of a polypropylene/ethylene copolymer having an ethylene content of 8% to 25% by weight of copolymer, and about 2 wt. % of an additive;
   wherein the monofilament, yarn, or tape respectively is a homogenous construction.

26. The monofilament, yarn, or tape of claim 25, wherein each has a tenacity of at least 0.9 g/Denier at 1% strain, at least 1.75 g/Denier at 2% strain, and at least 4 g/Denier at 5% strain.

27. The monofilament, yarn, or tape of claim 25, wherein each has a tenacity of about 1 g/Denier at 1% strain, about 1.95 g/Denier at 2% strain, and about 4.6 g/Denier at 5% strain.

* * * * *